INVENTORS:
JERRY RAY JOHNSON and
BY LAWTON L. JOHNSTON

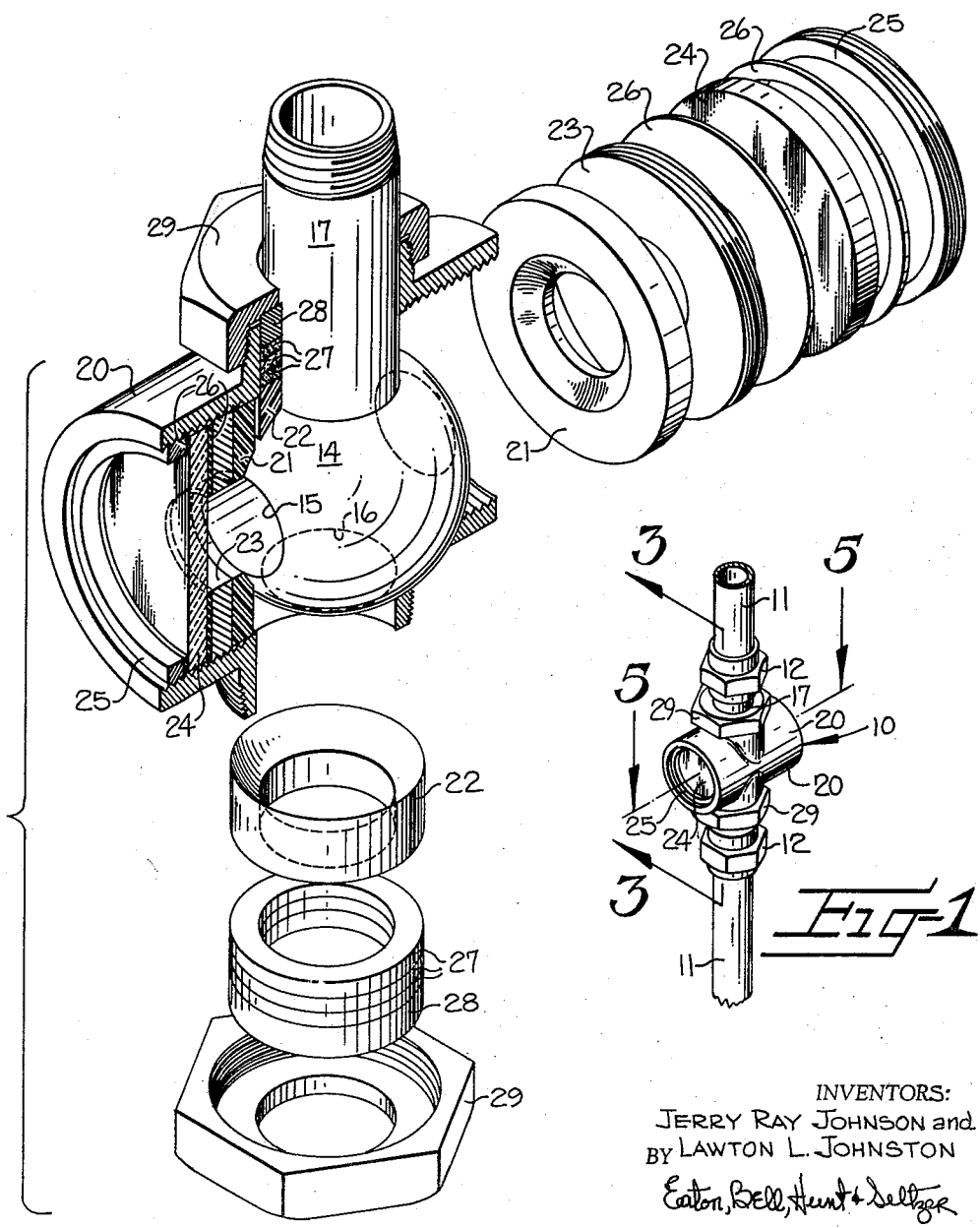
INVENTORS:
JERRY RAY JOHNSON and
LAWTON L. JOHNSTON
BY Eaton, Bell, Hunt & Seltzer
ATTORNEYS March 24, 1964 J. R. JOHNSON ETAL 3,125,882
SIGHT GLASS ASSEMBLY Filed March 20, 1962 2 Sheets-Sheet 2

Eaton, Bell, Hunt & Seltzer
ATTORNEYS

United States Patent Office 3,125,882
Patented Mar. 24, 1964

3,125,882
SIGHT GLASS ASSEMBLY
Jerry R. Johnson, 904 Wildwood Road, Aiken, S.C., and Lawton L. Johnston, P.O. Box 104, Graniteville, S.C.
Filed Mar. 20, 1962, Ser. No. 180,969
8 Claims. (Cl. 73—331)

This invention relates to sight glass assemblies for viewing a substance such as liquid in closed pipe systems and more specifically relates to such an assembly wherein the sight glass element may be readily removed from the assembly without removing the assembly from the system and without disturbing the normal flow of liquid in the system.

Sight glass assemblies have been used in closed pipe systems for many years in order to enable one working with the system to view the presence or flow of liquid in the system. Periodically, it is necessary to remove the sight glass itself from the assembly for one or more of various reasons, as for example (1) when such glass becomes contaminated with dirt or other foreign matter, (2) when the glass becomes opague with age or from some other reason, (3) when the glass cracks or breaks, or (4) for various other reasons.

Heretofore, when the necessity has arisen for removal of the glass from the assembly, it has been necessary to cut off the flow of liquid through the assembly before removing the glass therefrom for the obvious reason that the liquid in the system would otherwise pour out of the hole or void created by the removal of the glass. This necessity for cutting off the flow, of course, has many obvious disadvantages, the major one of which is probably the cessation of utilization of the entire pipe system or major portion thereof during the glass removal and replacement operation.

With the above problems in mind, it is the primary object of this invention to provide a sight glass assembly for a closed pipe system wherein the sight glass thereof may be readily replaced without disturbing the liquid in the system.

It is a further object of this invention to provide a sight glass assembly for a closed pipe system wherein the sight glass can be removed and readily replaced without a cessation of flow of the liquid and without the necessity for reducing the pressure in the pipe system.

Some of the objects of the invention having been stated, other objects will appear as the description proceeds when taken in connection with the accompanying drawings, in which:

FIGURE 1 is a fragmentary perspective view of a pipe system showing a sight glass assembly of the present invention mounted therein;

FIGURE 2 is an enlarged, exploded, perspective view of the sight glass assembly illustrated in FIGURE 1, with parts broken away for purposes of clarity;

Referring now more specifically to the figures and particularly to FIGURE 1, the numeral 10 broadly indicates a sight glass assembly of the invention positioned between the terminal pipe portions 11 of a pipe system and coupled together by suitable couplings or unions 12.

Figure 3:
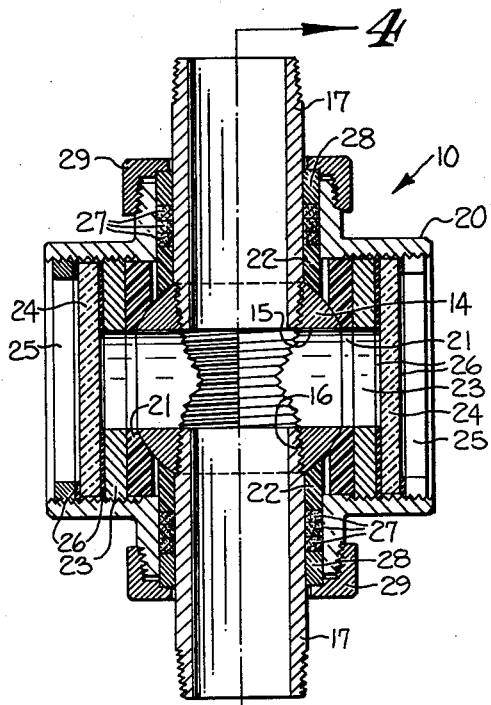
FIGURE 3 is a vertical sectional view taken along lines 3—3 of FIGURE 1.
Figure 4:
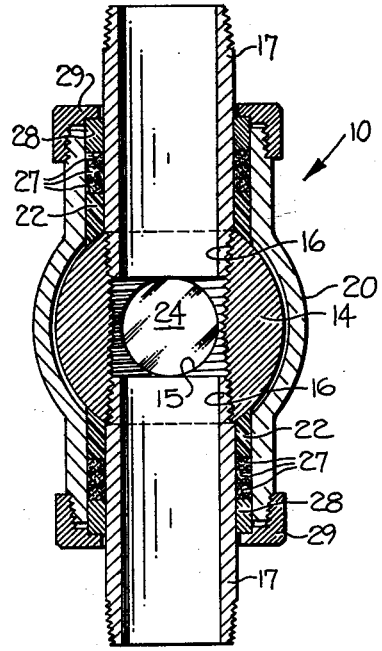
FIGURE 4 is a vertical sectional view taken along lines 4—4 in FIGURE 3.

As shown in FIGURES 2 to 4, the assembly 10 is provided with a core member 14 in the form of a sphere or ball which is provided with a pair of axial bores or openings 15 and 16 therethrough which are preferably disposed perpendicularly to each other, as shown. The wall of the vertically disposed bore 16 is provided with threads for threadably receiving threaded terminal portions of a pair of pipe nipples 17. The other terminal portions of the pipe nipples 17 are also threaded and are connected to the corresponding terminal pipe portions 11 of the pipe system by the corresponding couplings 12.

The core member 14 is surrounded by and supports a rotatable casing shown in the form of cross pipe fitting 20. Preferably, the opening through the horizontal arm of the cross pipe fitting 20 is of sufficient diameter to permit the insertion of the core member 14 therethrough in order to facilitate assembly of the entire device.

To insure stability of the core member 14 within the cross fitting 20, seats 21 in the form of sealing rings are positioned on each side of the core member 14 within the respective horizontal arms of the cross fitting 20. Similarly, seats 22 also in the form of sealing rings are provided on the top and bottom of the core member 14 within the respective vertical arms of the cross fitting 20. The inner surface facing the core member 14 on each of the seats 21 and 22 is provided with a partial spherical surface conforming to the surface of the core member 14 to thereby increase the surface contact and sealing relation between the respective seats and the sphere. Preferably, the seats 21 and 22 are constructed of a material having a relatively low coefficient of friction, such as "Teflon" or the like, in order to insure freedom of rotation of the cross fitting 20 around the core member 14 as will be discussed in greater detail hereafter.

As shown, a major portion of the horizontal arms of the cross fitting 20 are internally threaded, with each arm threadably receiving a seat adjusting nut 23 which is tightened against the respective seat 21 in order to force such seats securely against the core member 14 for obtaining the desired sealing relation. A sight glass 24 is further provided in each horizontal arm of the cross fitting 20 adjacent the respective seat adjusting nut 23. For holding each of the sight glasses 24 in its respective position, adjusting nuts 25 are provided. Preferably, gaskets 26 are provided on opposed sides of each sight glass 24 to prevent possible breakage of such glass elements when the adjusting nuts 25 are tightened to force each sight glass 24 into tight engagement with each seat adjusting nut 23. The presence of the gaskets 26 also further insures a leak-proof seal around each sight glass 24.

As further shown, each of the vertical arms of the cross fitting 20 is provided with suitable packing 27 extending around the periphery of each pipe nipple 17 and in intimate engagement with each seat 22. Further, packing gland rings 28 are provided in each such vertical arm between the packing 27 and the terminal portions of such arms. Finally, packing gland nuts 29 are threadably received on the respective externally threaded ends of each such vertical arm. As is readily apparent, the respective packing 27, packing gland rings 28 and packing gland nuts 29 all serve to force the respective seats 22 against the core member 14 while at the same time preventing a leakage of liquid out of the pipe system through the respective vertical arms of the cross fitting 20.

As shown in FIGURES 2 through 5, the cross fitting 20 is adapted to fit around the core member 14 in such a manner that the openings in the horizontal arms thereof will normally correspond to and be coincident with the horizontal bore 15 of the core member 14. Thus, in this position, it will be readily apparent that observation of the flow of liquid through the core member 14 is permitted.

Figure 5:
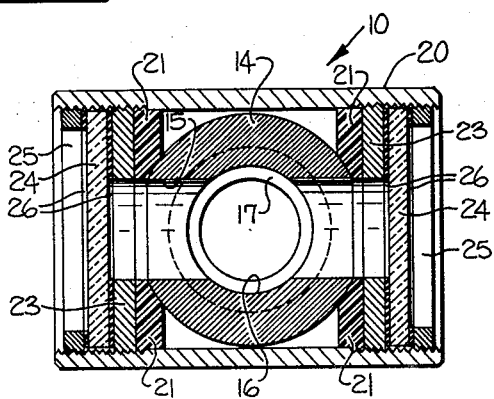
FIGURE 5 is a transverse sectional view taken along lines 5—5 in FIGURE 1 with the parts in normal operating position.
Figure 6:
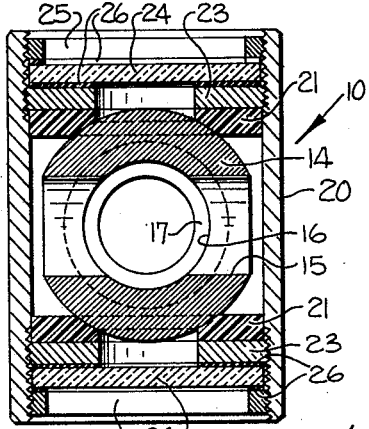
FIGURE 6 is a transverse sectional view similar to FIGURE 5, but showing the housing of the sight glass assembly moved to a closed position for removal of the sight glass.

When it becomes necessary or desirable to remove either or both of the sight glasses 24, such removal can be readily effectuated without in any way disturbing the normal flow of liquid through the core member 14 by merely rotating the cross fitting 20 ninety degrees from its normal position shown in FIGURE 5 to the closed position as shown in FIGURE 6. In this closed position, it can readily be seen that no liquid can pass from the inside of the core member into the sight glass areas because of the seal effectuated by the respective seats 21. Thereafter, upon replacement of the sight glasses 24 in their respective positions, the cross fitting 20 is again rotated ninety degrees in either direction to its normal position of FIGURE 5.

It is thus seen where there has been provided herein a new and novel sight glass assembly for use in closed pipe systems which assembly obviates the heretofore necessary step of removing liquid from the assembly during the absence of the sight glass therein.

In the drawings and specification there has been set forth a preferred embodiment of the invention and, although specific terms are employed, they are used in a generic and descriptive sense only and not for purposes of limitation, the scope of the invention being defined in the claims.

We claim:

1. A sight glass assembly for viewing liquid in a closed pipe system and wherein a sight glass in said assembly may be readily removed without disturbing the liquid in the system, said assembly comprising
    a core member having a bore communicatively connectable to said pipe system and adapted to receive liquid therein, said core member having a second bore transversely disposed relative to and communicating with said first recited bore,
    a housing surrounding said core member, said housing having at least one opening therein normally communicating with said second bore in said core member,
    a sight glass carried by the housing and positioned in said opening and serving for viewing the liquid,
    said core member and said housing being relatively movable with respect to each other to position said second bore in the core member and said opening in the housing out of communication with each other, thus to permit removal of the sight glass from said opening without disturbing the liquid in the pipe system.

2. A sight glass assembly for viewing liquid in a closed pipe system and wherein sight glasses in said assembly may be readily removed without disturbing the liquid in the system, said assembly comprising
    a core member having a bore communicatively connectable to said pipe system and adapted to receive liquid therein, said core member having a second bore therethrough transversely disposed relative to and communicating with said first recited bore,
    a housing surrounding said core member, said housing having a pair of openings therein disposed on opposite sides of said core member and normally communicating with said second bore thereof,
    a pair of sight glasses carried by the housing and being positioned in the respective openings therein and serving for viewing the flow of liquid through said first recited bore,
    said core member and said housing being relatively movable with respect to each other to position said second bore in the core member and said openings in the housing out of communication with each other, thus to permit removal of the sight glasses from the respective openings without disturbing the liquid in the pipe system.

3. A sight glass assembly for viewing liquid in a closed pipe system and wherein sight glasses in said assembly may be readily removed without disturbing the liquid in the system, said assembly comprising
    a spherical core member having a first axial bore communicatively connectable to said pipe system and adapted to receive liquid therein, said spherical core member having a second axial bore therethrough perpendicularly disposed relative to and communicating with said first bore,
    a housing surrounding said spherical core member having a first pair of openings in alinement with said first core bore and a second pair of openings therein disposed on opposite sides of said spherical core member and normally communicating with said second bore thereof,
    a pair of sight glasses carried by the housing and being positioned in said second pair of openings therein and serving for viewing the flow of liquid through said first bore,
    said spherical core member and said housing being relatively movable with respect to each other to position said second bore in the spherical core member and said second pair of openings in the housing out of communication with each other, thus to permit removal of the sight glasses from their respective openings without disturbing the liquid in the pipe system.

4. A sight glass assembly for viewing liquid in a closed pipe system and wherein the sight glasses in said assembly may be readily removed without disturbing the liquid in the system, said assembly comprising
    a spherical core member having a first axial bore communicatively connectable to said pipe system and adapted to receive liquid therein, said spherical core member having a second axial bore therethrough perpendicularly disposed relative to and communicating with said first recited bore,
    a housing surrounding said spherical core member and having a first pair of openings in alinement with said first core bore and a second pair of openings therein disposed on opposite sides of said spherical core member and normally communicating with said second bore thereof,
    a pair of sight glasses carried by the housing and being positioned in said second pair of openings therein and serving for viewing the flow of liquid through said first recited bore,
    sealing rings positioned in said second pair of openings of the housing in intimate contact with the core member and housing,
    said spherical core member and said housing being relatively movable with respect to each other to position said second bore in the spherical core member and said second pair of openings in the housing out of communication with each other, thus to permit removal of the sight glasses from their respective openings, while maintaining a sealing relationship between the housing and the spherical core member at these openings and without disturbing the flow of liquid in the pipe system.

5. A closed pipe system having a pair of pipes and a sight glass assembly interconnecting said pipes, said assembly comprising
    a core member having a bore therethrough communicatively connected to said pipes to accommodate the flow of a liquid, said core having a second bore transversely disposed relative to and communicating with said first recited bore,
    a pair of pipe nipples, each of said pipe nipples having one end thereof attached to said core member and communicating with said first recited bore, the other ends of said pair of pipe nipples being communicatively connected to respective proximal ends of said pipes,
    a housing surrounding said core member, said housing having at least one opening therein normally communicating with said second bore in said core member, a sight glass carried by the housing and positioned in said opening and serving for viewing the liquid, said core member and said housing being relatively movable with respect to each other to position said second bore in the core member and said openings in the housing out of communication with each other, thus to permit removal of the sight glass from said opening without disturbing the liquid in the pipe system.

6. A closed pipe system having a pair of pipes and a sight glass assembly interconnecting said pipes, said assembly comprising a core member having a bore therethrough communicatively connected to said pipes to accommodate the flow of a liquid, said core member having a second bore therethrough transversely disposed relative to and communicating with said first recited bore, a pair of pipe nipples, each of said pipe nipples having one end thereof attached to said core member and communicating with said first recited bore, the other ends of said pair of pipe nipples being communicatively connected to respective proximal ends of said pipes, a housing surrounding said core member, said housing having a pair of openings therein disposed on opposite sides of said core member and normally communicating with said second bore thereof, a pair of sight glasses carried by the housing and being positioned in the respective openings therein and serving for viewing the flow of liquid through said first recited bore in said core member, said core member and said housing being relatively movable with respect to each other to position said second bore in the core member and said openings in the housing out of communication with each other, thus to permit removal of the sight glasses from said openings without disturbing the liquid in the pipe system.

7. A closed pipe system having a pair of pipes and a sight glass assembly interconnecting said pipes, said assembly comprising a spherical core member having a first axial bore therethrough communicatively connected to said pipes to accommodate the flow of a liquid, said spherical core member having a second axial bore therethrough perpendicularly disposed relative to and communicating with said first bore, a pair of pipe nipples, each of said pipe nipples having one end thereof attached to said spherical core member and communicating with said first bore, the other ends of said pair of pipe nipples being communicatively connected to respective proximal ends of said pipes, a housing surrounding said spherical core member and having a first pair of openings in alinement with said first core bore and a second pair of openings therein disposed on opposite sides of said spherical core member and normally communicating with said second bore thereof, a pair of sight glasses carried by the housing and being positioned in said second pair of openings therein and serving for viewing the flow of liquid through said first bore, said spherical core member and said housing being relatively movable with respect to each other to position said second bore in the spherical core member and said second pair of openings in the housing out of communication with each other, thus to permit removal of the sight glasses from said openings without disturbing the liquid in the pipe system.

8. A closed pipe system having a pair of pipes and a sight glass assembly interconnecting said pipes, said assembly comprising a spherical core member having a first axial bore therethrough communicatively connected to said pipes to accommodate flow of a liquid, said spherical core member having a second axial bore therethrough perpendicularly disposed relative to and communicating with said first bore, a pair of pipe nipples, each of said pipe nipples having one end thereof attached to said spherical core member and communicating with said first bore, the other ends of said pair of pipe nipples being communicatively connected to respective proximal ends of said pipes, a housing surrounding said spherical core member and having a first pair of openings in alinement with said first core bore and a second pair of openings therein disposed on opposite sides of said spherical core member and normally communicating with said second bore thereof, a pair of sight glasses carried by the housing and being positioned in said second pair of openings therein and serving for viewing the flow of liquid through said first bore, sealing rings positioned in said second pair of openings of the housing in intimate contact with the spherical core member and housing, said spherical core member and said housing being relatively movable with respect to each other to position said second bore in the spherical core member and said second pair of openings in the housing out of communication with each other, thus to permit removal of the sight glasses from said openings while maintaining a sealing relationship between the housing and spherical core member at these openings and without disturbing the liquid in the pipe system.

No references cited.